United States Patent [19]

Robertson et al.

[11] Patent Number: 4,485,073

[45] Date of Patent: Nov. 27, 1984

[54] PROCESS OF PRODUCING MANGANESE SULFATE SOLUTIONS

[75] Inventors: Wilbert J. Robertson, Oklahoma City; Roger C. Shaw, Edmond, both of Okla.

[73] Assignee: Kerr-McGee Chemical Corporation, Oklahoma City, Okla.

[21] Appl. No.: 577,997

[22] Filed: Feb. 8, 1984

[51] Int. Cl.$^3$ ............................................. C01G 45/10
[52] U.S. Cl. ......................................... 423/49; 423/52; 423/605
[58] Field of Search .................... 423/49, 52; 75/121

[56] References Cited

U.S. PATENT DOCUMENTS

| | | | |
|---|---|---|---|
| 1,279,110 | 9/1918 | Haslup | 423/52 |
| 3,227,520 | 1/1966 | Samonides | 423/52 |
| 3,434,947 | 3/1969 | Steintveit | 204/119 |
| 3,493,365 | 2/1970 | Pickering et al. | 75/101 |
| 3,667,906 | 6/1972 | Sasaki | 23/145 |
| 3,864,118 | 2/1975 | Schumacher et al. | 423/49 |
| 4,285,913 | 8/1981 | Soni et al. | 423/50 |

FOREIGN PATENT DOCUMENTS 393341 12/1973 U.S.S.R. .............................. 75/121

*Primary Examiner*—Herbert T. Carter
*Attorney, Agent, or Firm*—WilliaM G. Addison; John P. Ward

[57] ABSTRACT

A process for preparing manganese sulfate solutions having reduced concentrations of potassium impurity is disclosed wherein a digestion mixture of a reduced manganese ore, a source of water soluble aluminum ions, a source of water soluble ferric ions and an aqueous acid solution is prepared, having a solution pH ranging from about 0.5 to about 3.5. The mixture is then digested at a temperature sufficient to produce a mixed digestion product comprising a liquid phase of a manganese sulfate solution and a solid phase of digested ore residue and a particulate complex salt by-product. The liquid phase of manganese sulfate solution is then recovered from the mixed digestion product. An additional feature of this process involves conducting the digestion of the digestion mixture in the presence of at least one complex salt of the general formula:

$$MFe_nAl_{3-n}(SO_4)_2(OH)_6$$

where M is $Na^+$, $K^+$ or $NH_4^+$ and n is a number ranging from about 1 to about 3.

21 Claims, No Drawings

PROCESS OF PRODUCING MANGANESE SULFATE SOLUTIONS

CROSS REFERENCE TO RELATED APPLICATIONS

Aspects of the present invention are related to subject matter disclosed in co-pending applications entitled "IMPROVEMENTS IN THE MANUFACTURE OF MANGANOUS SULFATE SOLUTIONS" Ser. No. 577,996 and "METHOD OF PRODUCING MANAGANESE SULFATE SOLUTIONS OF IMPROVED PURITY", Ser. No. 577,995, both co-pending applications filed on an even date herewith and both assigned to the same assignee as the present invention.

FIELD OF THE INVENTION

The present invention relates to the preparation of manganese sulfate solutions for use in the manufacture of electrolytic manganese dioxide. More particularly, the invention relates to the preparation of manganese sulfate solutions containing low concentrations of potassium as an impurity.

BACKGROUND OF THE INVENTION

It is known that manganese dioxide of a grade suitable for use as a depolarizer in dry cell batteries can be manufactured synthetically from precursor manganese sulfate solutions by the oxidation, either electrolytically or by use of an oxidizing agent, of the manganese ion in said solutions to manganese dioxide. Further, it is known that the precursor manganese sulfate solution can be prepared by the reduction and digestion of naturally occurring manganese ores such as those of the pyrolusite/cryptomelane type. However, a drawback to the use of such manganese ores and particularly those ores of the cryptomelane type is the presence therein of high levels of potassium.

The presence of potassium impurity in electrolytic manganese dioxide adversely affects the latter's capability to function satisfactorily as a depolarizer in dry cell batteries. As a result, numerous solutions have been proposed for removing potassium impurity from electrolytic manganese dioxide. The majority of these proposed solutions relate to the removal of potassium impurity during the preparation of the precursor manganese sulfate solution. For example, in U.S. Pat. No. 3,667,906 there is disclosed a method of removing potassium impurity from naturally occurring manganese ores used in the preparation of the manganese sulfate electrolyte comprising washing a reduced or calcined manganese ore with superheated hot water to remove soluble potassium prior to subjecting said reduced or calcined manganese ore to subsequent acid leaching and separation steps.

U.S. Pat. No. 4,285,913 describes a process for producing manganese sulfate electrolyte solutions containing reduced concentrations of potassium. In this patent, there is described a process wherein a reduced or calcined manganese ore containing potassium impurity is leached with a liquor comprising spent electrolyte (i.e., an aqueous solution containing sulfuric acid and manganese ion) to which has been added a source of iron to provide soluble ferric ions. The leaching process is carried out under such specific conditions of pH, time and temperature at to yield a manganese sulfate solution disclosed as having reduced levels of potassium impurity. Subsequent treatment of this solution with additional reduced or calcined ore to raise the solution pH of the mixture and to precipitate the remaining iron thus provides an electrolyte highly suited to the preparation of electrolytic manganese dioxide.

Although not mentioned in U.S. Pat. No. 4,285,913, the invention therein described apparently makes use of the "jarosite process", named after the resulting iron precipitate, as described in U.S. Pat. Nos. 3,434,947 and 3,493,365 and employed in the zinc industry for the recovery of zinc and other valuable metals by electrolytic processes. In this process, small amounts of ammonium, sodium or potassium ion are added to a leach liquor resulting from the leaching of a zinc calcine, neutralized and the iron impurity present in the solution precipitated out, as jarosite having the formula

$(NH_4, Na \text{ or } K)Fe_3(SO_4)_2(OH)_6$.

Another process for producing manganese sulfate solutions having reduced concentrations of potassium as an impurity is the improved process described in co-pending and commonly assigned U.S. application Ser. No. 577,996 and entitled "IMPROVEMENTS IN THE MANUFACTURE OF MANGANESE SULFATE SOLUTIONS". The improvement described therein is based on the discovery that when a digestion mixture of a reduced manganese ore containing potassium impurity, a source of water soluble ferric ions and an aqueous acid solution of, for example, a spent electrolyte is digested at elevated temperatures in the presence of a preformed potassium-iron salt, an accelerated rate and extent of removal of the potassium impurity can be achieved. The use of the preformed salt also allows for employment of lower temperatures during the digestion of the mixture although the solution pH still must be maintained between about 0.5 to about 3.5 to take advantage of the presence of the preformed salt.

Yet another process for producing manganese sulfate solutions having reduced concentrations of potassium impurity is the process described in copending and commonly assigned U.S. application Ser. No. 577,995 and entitled "METHOD OF PRODUCING MANGANESE SULFATE SOLUTIONS OF IMPROVED PURITY". In the process described therein a digestion mixture of reduced manganese ore, a source of added water soluble aluminum ions and an aqueous acid solution, such as spent electrolyte first is prepared and then digested. The resulting mixed reaction product comprises a liquid phase of manganese sulfate solution and a solid phase of digested ore residue and a potassium-aluminum salt byproduct which is formed by reaction of potassium impurity with the aluminum ions. The advantage to using aluminum ions is that significantly less acidic conditions need be employed. In fact, mixtures having solution pH's of at least 4.0 must be employed to effect removal of potassium impurity during digestion of the mixture. Another feature of the process described in the above application is the use of the potassium-aluminum salt byproduct as a means to reduce the induction period for the reaction between the potassium impurity and aluminum ions in the digestion mixture.

While the processes of the above-noted patents and applications are effective in reducing the concentration of potassium impurity in manganese sulfate solutions there still exists a need for processes which will provide even further improvements in the rate at and extent to which potassium removal can be achieved. The process comprising the present invention provides such further improvements.

SUMMARY OF THE INVENTION

As described in greater detail hereinafter, the present invention relates to a process which may be operated continuously or batchwise for the production of manganese sulfate solutions containing low concentrations of potassium as impurity. In general, the process of the present invention comprises blending a reduced manganese ore containing potassium impurity, an added source of water soluble aluminum ions, a source of water soluble ferric ions, and an aqueous acid solution selected from the group consisting of aqueous sulfuric acid and spent aqueous electrolyte containing sulfuric to form a digestion mixture having a solution pH ranging from about 0.5 to about 3.5. The mixture then is digested at a temperature sufficient to form a mixed reaction product comprising a liquid phase of manganese sulfate solution and a solid phase containing digested ore residue and a particulate complex salt by-product. Finally, the liquid phase of manganese sulfate solution is recovered from the mixed reaction product.

A further embodiment of the invention comprises contacting the mixture described hereinabove during the digestion thereof with at least one complex salt correspondng to the general formula $$MFe_nAl_{3-n}(SO_4)_2(OH)_6$$

where M is $Na^+$, $K^+$ or $NH_4^+$ cation and n is a number ranging from about 1 to 3. In a preferred embodiment the cation, M, of the complex salt is $K^+$, and n is a number ranging from about 2.0 to about 3.0.

DETAILED DESCRIPTION OF THE INVENTION

As noted hereinabove, the present invention comprises a novel process for the preparation of manganese sulfate cell feed solutions useful in the manufacture of electrolytic manganese dioxide. Through the use of the present invention, manganese sulfate cell feed solutions can be prepared which are characterized by substantially reduced concentrations of potassium as an impurity.

In accordance with the practice of the present invention, a digestion mixture of a reduced manganese ore containing potassium impurity, an added source of water soluble aluminum ions, a source of water soluble ferric ions and an aqueous acid solution selected from the group consisting of aqueous sulfuric acid and spent aqueous electrolyte containing sulfuric acid is prepared by blending the above constituents in appropriate proportions in a mixing zone. The manganese ore employed in the practice of this invention may be any one of a number of naturally occurring ores available, which contain potassium as an impurity. Furthermore, ore employed in this invention will be in a reduced state, i.e. all or substantially all of the manganese (IV) ions in the ore will have been reduced to manganese (II) ions. Procedures for reducing manganese ores are well known and do not form a part of the present invention. An example of a procedure for reducing manganese ores can be found in U.S. Pat. No. 3,667,906 wherein is described the heating of such ores at elevated temperatures (e.g., 400° C. to 1200° C.) in the presence of reducing agents.

Following reduction of the ore, to convert all or substantially all of the manganese (IV) ions in said ore to manganese (II) ions, the ore will be comminuted to increase its effective surface area and improve its susceptibility to subsequent digestion with the aqueous acid solution. One known method employed for the comminution of reduced manganese ores is ball milling wherein the ore is reduced to the desired size in a rotatable vessel containing crushing means such as cast iron balls. A liquid medium such as water also may be added to the vessel in order to aid comminution of the ore and to provide for a pumpable slurry.

As noted hereinabove, the digestion mixture prepared and employed in the present invention also will include an added source of water soluble aluminum ions. The source of aluminum ions is not critical to the operation of the present invention; however, it is important that such source be capable of providing free aluminum ions in the mixture in amounts sufficient to provide a minimum aluminum ion to potassium ion mole ratio as defined hereinbelow. Representative examples of sources of water soluble aluminum ion suitable in carrying out the process herein described include aluminum salts such as aluminum chloride, aluminum sulfate and the like and aluminum metal which previously has been dissolved in an acid such as hydrochloric acid, sulfuric acid and the like. The reduced ore itself also may be a source of water soluble aluminum ion. However, the addition of an external source of aluminum ion will be necessary to supplement the aluminum ion in the ore to provide the minimum mole ratio of aluminum to potassium ion in the digestion mixture as set forth below.

Generally, the water soluble aluminum ion will be present in the digestion mixture in amounts sufficient to provide a minimum mole ratio of aluminum ion to potassium ion in said mixture of at least about 4:1. Higher ratios may be employed, with the rate of potassium removal increasing proportionally therewith. Generally the aluminum ion will be present in amounts sufficient to provide aluminum ion to potassium ion mole ratios ranging from about 4:1 to about 20:1.

The digestion mixture prepared and employed in the practice of this invention also will include a source of water soluble ferric ions. As with the source of aluminum ions, the source of said ferric ions is not critical aside from the proviso that said source must be capable of providing free ferric ions in the digestion mixture. As in the case of aluminum ion, the source of ferric ion can be an external source of ferric ion or the reduced ore itself. Representative examples of such external sources of ferric ion include metallic iron and ferromanganese dissolved in acid and oxidized with air, $H_2O_2$, $MnO_2$, $NaClO_3$ and the like and various iron salts such as ferric and ferrous sulfates, nitrates, chlorides and the like. When the ore itself is used as a source of the ferric ion, it may be necessary to supplement the ferric ion from the ore with ferric ion from an external source in order to provide, in the digestion mixture, at least a minimum mole ratio of ferric ion to potassium ion. In general, the water soluble ferric ion will be present in the digestion mixture in amounts sufficient to provide a mole ratio of $Fe^{+3}$ to $K^{+1}$ of at least 1:1. Normally, however, best results are achieved at mole ratios ranging from about 4:1 or greater with ratios ranging from about 8:1 to about 12:1 being preferred.

The aqueous acid solution blended with the reduced ore may be either a fresh aqueous sulfuric acid solution or spent aqueous electrolyte (i.e., on aqueous sulfuric acid solution containing manganese ion) from the electrolytic cells in which electrolytic manganese dioxide is produced. In either event the free sulfuric acid concentration in said solution generally will range from about 10 to about 50 grams per liter of such solution.

The reduced manganese ore, source of water soluble aluminum ion, source of water soluble ferric ions and aqueous acid solution will be blended in such proportions to provide a digestion mixture having a solution pH ranging from about 0.5 to about 3.5. Preferably, these materials will be blended in such proportions as to provide a digestion mixture having a solution pH of from about 2.0 to about 3.0 and, preferably, from about 2.1 to about 2.8. In the main, it will be the relative portions of the reduced ore and aqueous acid solution in the digestion mixture that will determine the solution pH of the digestion mixture. Knowing the basicity and acidity of these materials respectively, one of skill in the art readily can determine the precise amount of these materials which must be employed to provide the digestion mixture with solution pH's within the above-specified ranges.

On completion of the blending of the reduced manganese ore, the sources of water soluble aluminum and ferric ions and the aqueous acid solution, the resulting mixture then is digested, in a digestion zone, at temperatures sufficient to leach manganese (II) ions from the ore and form a liquid phase of manganese sulfate solution. Elevated temperatures at which the mixture will be digested will range from about 45° C. up to the boiling point of the solution. Generally temperatures ranging from about 50° C. to about 95° C. will be preferred.

The digestion zone, in which digestion of the mixture will take place, may comprise a single digestion vessel or a plurality of digestion vessels connected to each other in series. In the practice of the present invention, a preferred method of operation is to carry out the digestion of the mixture in a plurality of digestion vessels with the digestion mixture being conveyed from one digestion vessel to the next on a continuous basis. In this preferred method of operation, the temperature and solution pH of the digestion mixture, as it is conveyed from one digestion vessel to the next, may be varied, but will remain within the ranges set forth herein for such parameters. In general, said mixture will be maintained at about relatively the same temperature, as it is conveyed from vessel to vessel. However, in this method of operation, the solution pH of the digestion mixture may be raised gradually as the mixture is conveyed from vessel to vessel. The raising of the solution pH can be achieved by the introduction of additional reduced ore into the digestion mixture as it progresses through the series of digestion vessels. In no event, though, will the solution pH of the digestion mixture in any given digestion vessel exceed about 3.5.

Heat, for effecting digestion of the reduced ore in the mixture, may be supplied by such means as steam or through the use of a heated aqueous acid solution to prepare the digestion mixture. Thus, in the preferred method of operation, described immediately above, heat may be provided to the digestion mixture through the use of steam coils in one or more of the plurality of vessels in the process train or by the use of a heated aqueous acid solution to prepare the digestion mixture. In a most preferred embodiment, hot, spent aqueous electrolyte containing sulfuric acid will be employed to prepare the digestion mixture and to supply the necessary heat to said mixture for the digestion thereof.

In addition to manganese (II) ions being leached from the reduced manganese ore and reacting with the free sulfuric acid in the aqueous acid solution to form the manganese sulfate solution, the potassium impurity, as potassium ions, also will be leached from the reduced ore. However, it has been discovered that under the temperature and pH conditions employed during digestion of the mixture, these potassium ions readily will react with both the aluminum and the ferric ions to form a particulate complex salt or mixture of particulate complex salt byproducts believed to have the general formula

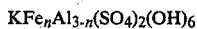

$$KFe_nAl_{3-n}(SO_4)_2(OH)_6$$

where n is an integer ranging from about 1 to about 3 and, generally, from about 2 to about 3. This discovery is unexpected in view of the teachings in U.S. application Ser. No. 577,995 to the effect that little or no reaction between the potassium impurity and aluminum ions is observed at solution pH's below 4.0. Also surprising is the fact that the rate of potassium removal is accelerated even further when a combination of aluminum and ferric ions is employed as compared to the use of ferric ion alone.

Following completion of the digestion of the above described mixture and the formation of a mixed reaction product of a liquid phase of manganese sulfate solution and a solid phase containing the particulate complex salt byproduct or mixture of particulate complex salt byproducts corresponding to the above general formula and digested ore residue these liquid and solid phases are separated from one another in a suitable separation zone. Generally, it is desirable to subject the manganese sulfate solution to further purification techniques such as treatment with hydrogen sulfide to remove heavy metal impurities such as cobalt, nickel and the like, prior to its introduction into an electrolytic cell for use in the manufacture of electrolytic manganese dioxide.

In the practice of the present invention, it also has been discovered that if digestion of the mixture of reduced ore, aqueous acid solution and water soluble aluminum and ferric ions is carried out in the presence of at least one complex salt of the general formula

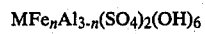

$$MFe_nAl_{3-n}(SO_4)_2(OH)_6$$

where M is $Na^+$, $K^+$ or $NH_4^+$ and n is a number ranging from about 1 to about 3 and, preferably, from about 2 to about 3 the induction period associated with the reaction between the potassium impurity and the aluminum and ferric ions is reduced dramatically. This dramatic decrease in the induction period results in not only a more complete removal of the potassium impurity but removal of the aluminum and ferric ions as well. In a preferred embodiment, the complex salt employed for this purpose will be one in which M in the above formula is potassium ion, i.e., $K^+$, and most preferably will constitute the particulate complex salt byproduct or mixture of particulate complex salt byproducts formed in situ during the digestion of a prior digestion mixture of said reduced manganese ore, aluminum and ferric ions and aqueous acid solution. The complex salt byproduct or mixture of complex salt byproducts formed during the digestion of said prior mixture, and contained in the solid phase of the resulting liquid/solid mixed reaction product, can be recovered readily. The recovered salt byproduct or mixture of salt byproducts then is combined with fresh digestion mixture in a digestion zone wherein the removal of potassium impurity is accelerated during the digestion of said fresh mixture. Alternatively, the solid phase of the resulting liquid/solid mixture reaction product can be recovered and combined with a fresh quantity of the digestion in the digestion zone.

The amount of complex salt, corresponding to the above general formula, present in the digestion mixture during the digestion thereof is not critical. In general, however, the amount present must be an amount sufficient to provide a complex salt concentration in the digestion mixture of at least about 5.0 grams of said complex salt per liter of the aqueous acid solution in said digestion mixture. Preferably the amount will be an amount sufficient to provide a complex salt concentration ranging from about 5.0 to about 80 grams of the complex salt per liter of the aqueous acid solution.

As noted hereinabove, through the practice of the process of this invention, the level of potassium impurity normally present in manganese sulfate solutions for use in the manufacture of electrolytic manganese dioxide can be reduced substantially. Thus, as a result of the use of this invention, manganese sulfate solutions containing as little as five parts by weight of potassium per million parts by weight of manganese sulfate solution can be prepared.

The following examples illustrate the invention described herein and are not intended to limit the scope and spirit of the invention. All parts and percentages, where used, are by weight unless noted to be otherwise.

EXAMPLES 1-6

A series of experiments was carried out to demonstrate the effectiveness of using a combination of water soluble aluminum and ferric ions either alone or in further combination with the complex salt defined below to provide manganese sulfate solutions with substantially reduced concentrations of potassium impurity. In each of Experiment Nos. 1-6 in the series a solution representing a leach liquor containing 30 grams per liter (g/l) of solution of manganese, as manganese (II) ions, 1.2 g/l of solution of ferric ion and 225 milligrams (mg) per liter of solution of potassium ion. Equal quantities of this solution were added to each of six separate round bottom flasks equipped with means for stirring and heating of the solutions. To each flask then were added 5.0 g/l of crystals of a preformed complex salt byproduct of the general formula $$KFe_nAl_{3-n}(SO_4)_2(OH)_6$$

and having an analysis of 0.8 weight percent of aluminum, 6.9 weight percent of potassium and 30 weight percent of iron. All data are set forth in Table I below.

TABLE I

| Experiment No. | 1 | 2 | 3 | 4 | 5 | 6 |
|---|---|---|---|---|---|---|
| Temp., °C. | 50 | 50 | 50 | 50 | 50 | 50 |
| pH | 2.5 | 2.5 | 2.75 | 2.75 | 3.0 | 3.0 |
| Al, g/l | 0 | 3 | 0 | 3 | 0 | 3 |
| Time, hrs. | Potassium Ion Concentration, mg/l | | | | | |
| 0.0 | 225 | 225 | 225 | 225 | 225 | 225 |
| 0.5 | 160 | 100 | 150 | 110 | 180 | 130 |
| 2.0 | 96 | 62 | 54 | 42 | 150 | 110 |
| 6.0 | 54 | 38 | 24 | 22 | 130 | 95 |

TABLE I-continued

| | | | | | | |
|---|---|---|---|---|---|---|
| 24 | 36 | 12 | 24 | 6 | 58 | 18 |

As can be seen from the data in Table I, the use of a combination of aluminum and ferric ions to remove potassium ion from solution is clearly more effective than the use of ferric ion alone. This result is surprising and totally unexpected in light of the teachings of copending and commonly assigned U.S. application Ser. No. 577,995 which discloses that the beneficial effect of added water soluble aluminum ions can be realized only when the solution pH's of the mixture being subjected to digestion conditions are at least about 4.0.

While the invention has been disclosed with respect to what at present are believed to be the preferred embodiments thereof, it is to be understood that this invention is not to be limited to these specific embodiments and that changes may be made in and to the invention without departing from the spirit and scope thereof except as provided in the following claims.

What is claimed is:

1. A process for the preparation of manganese sulfate solutions for use in the manufacture of electrolytic manganese dioxide, said solutions having substantially reduced concentrations of potassium impurity, comprising:
   A. blending a reduced manganese ore, an added source of water soluble aluminum ions, a source of water soluble ferric ions and an aqueous acid solution selected from the group consisting of aqueous sulfuric acid and spent aqueous electrolyte containing sulfuric acid to form a digestion mixture having a solution pH ranging from about 0.5 to about 3.5;
   B. digesting said mixture at a temperature sufficient to form a mixed reaction product comprising a liquid phase of manganese sulfate solution and a solid phase containing digested ore residue and a particulate complex salt byproduct or mixture of particulate complex salt byproducts and
   C. recovering said liquid phase of manganese sulfate solution from said mixed digestion product.

2. The process of claim 1 wherein said mixture is digested while in contact with at least one complex salt corresponding to the general formula $$MFe_nAl_{3-n}(SO_4)_2(OH)_6$$

where M is Na+, K+ or NH4+ and n is a number ranging from about 1 to about 3.

3. The process of claim 2 wherein the solution pH of the digestion mixture ranges from about 2.1 to about 2.8.

4. The process of claim 2 wherein the added source of water soluble aluminum ion is an aluminum salt.

5. The process of claim 2 wherein the source of water soluble ferric ion is selected from the group consisting of iron sulfates, iron nitrates and iron chlorides.

6. The process of claim 2 wherein the aqueous acid solution is spent aqueous electrolyte containing sulfuric acid.

7. The process of claim 2 wherein said mixture is digested at a temperature ranging from about 45° C. up to about the boiling point of said mixture.

8. The process of claim 7 wherein the said mixture is digested at a temperature ranging from about 50° C. to about 95° C.

9. The process of claim 2 wherein the complex salt, contacted with the digestion mixture while said mixture is being digested, is the particulate complex salt byproduct of mixture of particulate complex salt byproducts formed in situ during the digestion of a prior mixture of said reduced manganese ore, added source of water soluble aluminum ions, source of water soluble ferric ions and the aqueous acid solution, said complex salt being contained in a solid phase of a mixed reaction product, produced during the digestion of said prior mixture.

10. The process of claim 9 wherein the solid phase of said mixed reaction product is recovered and recycled back to and contacted with fresh digestion mixture during the digesting thereof.

11. The process of claim 9 wherein said complex salt is recovered from the solid phase of the mixed reaction product and recycled back to and contacted with fresh digestion mixture during the digesting thereof.

12. The process of claim 9 wherein the particulate complex salt or mixture of particulate complex salt byproducts formed in situ corresponds to the general formula $$KFe_nAl_{3-n}(SO_4)_2(OH)_6$$

where n is a number ranging from about 2 to about 3.

13. A process for the preparation of manganese sulfate solutions for use in the manufacture of electrolytic manganese dioxide having substantial reduced concentrations of potassium impurity, comprising:

A. blending a reduced manganese ore, a source of water soluble aluminum ions, a source of water soluble ferric ions selected from the group consisting of iron sulfates, iron nitrates and iron chlorides and a spent aqueous electrolyte containing sulfuric acid to form a digestion mixture having a solution pH ranging from about 2.1 to about 2.8;

B. digesting said mixture at a temperature ranging from about 45° C. up to about the boiling point of said mixture to form a mixed digestion product comprising a liquid phase of manganese sulfate solution and a solid phase of digested ore residue and a particulate complex salt byproduct or mixture of particulate complex salt byproducts and C. recovering said liquid phase of manganese sulfate solution from said digestion product, said mixture being digested while in contact with at least one complex salt corresponding to the general formula $$MFe_nAl_{3-n}(SO_4)_2(OH)_6$$

where M is $Na^+$, $K^+$ or $NH_4^+$ and n is a number ranging from 1 to about 3.

14. The process of claim 13 wherein said mixture is digested at a temperature ranging from about 50° C. to about 95° C.

15. The process of claim 13 wherein the complex salt contacted with the digestion mixture while said mixture is being digested, is the particulate complex salt byproduct or mixture of particulate complex salt byproducts formed in situ during the digestion of a prior mixture of said reduced manganese ore, added source of water soluble aluminum ions, source of water soluble ferric ions and the aqueous acid solution, said complex salt being contained in a solid phase of a mixed reaction product produced during the digestion of said prior mixture.

16. The process of claim 15 wherein the solid phase of the mixed reaction product produced during the digestion of said prior mixture is recovered and recycled back to and contacted with fresh digestion mixture during the digesting thereof.

17. The process of claim 15 wherein said complex salt is recovered from the solid phase of the mixed reaction product produced during the digestion of said prior mixture and recycled back to and contacted with fresh digestion mixture during the digestion thereof.

18. The process of claim 15 wherein the particulate complex salt byproduct or mixture of particulate complex salt byproducts formed in situ correspond to the general formula $$KFe_nAl_{3-n}(SO_4)_2(OH)_6$$

where n is a number ranging from about 2 to about 3.

19. The process of claim 13 wherein the added source of water soluble aluminum ions is an aluminum salt.

20. The process of claim 13 wherein the source of water soluble ferric ions is ferric sulfate.

21. The process of claim 13 wherein the digestion of said mixture is carried out, on a continuous basis, in a plurality of digestion vessels connected in series.

* * * * *